United States Patent
Baardman

(10) Patent No.: US 10,670,757 B2
(45) Date of Patent: Jun. 2, 2020

(54) METHODS AND SYSTEMS FOR QUANTIFYING COHERENCY AND CONSTRAINING COHERENCY-BASED SEPARATION IN SIMULTANEOUS SHOOTING ACQUISITION

(71) Applicant: PGS Geophysical AS, Oslo (NO)

(72) Inventor: Rolf Huibert Baardman, Rotterdam (NL)

(73) Assignee: PGS Geophysical AS, Oslo (NO)

( * ) Notice: Subject to any disclaimer, the term of this patent is extended or adjusted under 35 U.S.C. 154(b) by 917 days.

(21) Appl. No.: 14/264,237

(22) Filed: Apr. 29, 2014

(65) Prior Publication Data

US 2015/0241587 A1 Aug. 27, 2015

Related U.S. Application Data

(60) Provisional application No. 61/944,688, filed on Feb. 26, 2014.

(51) Int. Cl.
- *G01V 1/00* (2006.01)
- *G01V 1/28* (2006.01)
- *G01V 1/36* (2006.01)

(52) U.S. Cl.
CPC ........ *G01V 1/364* (2013.01); *G01V 2210/127* (2013.01)

(58) Field of Classification Search
CPC ............. G01V 1/364; G01V 1/28; G01V 1/30
USPC .......................................................... 702/17
See application file for complete search history.

(56) References Cited

U.S. PATENT DOCUMENTS

| | | | |
|---|---|---|---|
| 3,676,841 A | 7/1972 | Anstey | |
| 4,458,339 A | 7/1984 | Wason | |
| 5,594,706 A * | 1/1997 | Shenoy | G01V 1/48 367/25 |
| 6,636,810 B1 * | 10/2003 | Moore | G01V 1/28 702/17 |
| 6,906,981 B2 | 6/2005 | Vaage | |
| 7,660,196 B2 * | 2/2010 | Saiki | G01V 1/36 367/31 |
| 8,295,124 B2 | 10/2012 | Abma | |
| 8,299,794 B2 | 10/2012 | Farrelly et al. | |
| 8,345,510 B2 | 1/2013 | Hegna et al. | |
| 8,553,496 B2 | 10/2013 | Decker et al. | |

(Continued)

FOREIGN PATENT DOCUMENTS

EP 2592439 A2 5/2013

OTHER PUBLICATIONS

James Brady et al., "Electromagnetic Sounding for Hydrocarbons", Oilfield Review, Spring 2009, 21, No. 1, pp. 4-19.

(Continued)

*Primary Examiner* — Michael P Nghiem

(57) ABSTRACT

This disclosure presents methods and systems for deblending blended seismic data obtained during simultaneous shooting acquisition into deblended seismic data gathers. Methods and systems iteratively separate the blended seismic data into the deblended seismic data gathers based on semblance analysis of a residual difference between the blended seismic data and the deblended seismic data gathers. Each deblended seismic data gather is associated with one of the sources and appears to have been obtained without substantial interference from seismic energy produced by other sources.

19 Claims, 13 Drawing Sheets

(56) References Cited

U.S. PATENT DOCUMENTS

| | | | |
|---|---|---|---|
| 8,559,270 B2 | 10/2013 | Abma | |
| 9,075,162 B2* | 7/2015 | Baardman | G01V 1/36 |
| 2002/0181328 A1* | 12/2002 | de Kok | G01V 1/005 367/73 |
| 2004/0013037 A1* | 1/2004 | Vaage | G01V 1/006 367/21 |
| 2004/0049347 A1* | 3/2004 | Fookes | G01V 1/3808 702/14 |
| 2004/0243312 A1* | 12/2004 | Schonewille | G01V 1/362 702/14 |
| 2005/0027454 A1* | 2/2005 | Vaage | G01V 1/364 702/17 |
| 2009/0323470 A1* | 12/2009 | Ferris | G01V 1/364 367/24 |
| 2010/0008184 A1* | 1/2010 | Hegna | G01V 1/36 367/21 |
| 2010/0299070 A1* | 11/2010 | Abma | G01V 1/005 702/14 |
| 2012/0014212 A1 | 1/2012 | Eick et al. | |
| 2012/0014213 A1 | 1/2012 | Eick et al. | |
| 2012/0033525 A1 | 2/2012 | Abma et al. | |
| 2012/0147699 A1 | 6/2012 | Dellinger et al. | |
| 2012/0147701 A1 | 6/2012 | Ross et al. | |
| 2012/0176861 A1 | 7/2012 | Abma et al. | |
| 2013/0088235 A1 | 4/2013 | Hegna et al. | |
| 2013/0088938 A1 | 4/2013 | Aaron et al. | |
| 2013/0121109 A1* | 5/2013 | Baardman | G01V 1/36 367/24 |
| 2013/0215712 A1* | 8/2013 | Geiser | G01V 1/288 367/9 |
| 2013/0322205 A1 | 12/2013 | Widmaier et al. | |
| 2014/0036060 A1* | 2/2014 | Claussen | G01V 1/003 348/85 |
| 2014/0219052 A1* | 8/2014 | Bekara | G01V 1/362 367/24 |
| 2014/0269169 A1* | 9/2014 | van Borselen | G01V 1/3861 367/15 |
| 2014/0355379 A1 | 12/2014 | Moldoveanu et al. | |
| 2015/0063064 A1* | 3/2015 | van Groenestjin | G01V 1/362 367/21 |
| 2015/0185342 A1* | 7/2015 | van Groenestijn | G01V 1/364 702/14 |
| 2016/0320508 A1* | 11/2016 | Peng | G01V 1/36 |

OTHER PUBLICATIONS

Staff Report, "2014 Meritorious Awards for Engineering Innovation", www.epmag.com/item/print/2014-Meritorious-Awards-Engineering-Innovation-132699, Aug. 28, 2014, see p. 8, 12 pages total.

United Kingdom Search Report dated Jul. 24, 2015, in the prosecution of patent application No. GB1503220.4, 3 pages.

Qu et al. "Separation of Simultaneous Vibroseis Data", SEG Denver 2014 Annual Meeting, pp. 4340-4344.

Akerberg, Peeter, et al., "Simultaneous source separation by sparse Radon transform," SEG Las Vegas 2008 Annual Meeting, pp. 2801-2805.

Howe, Dave et al., "Independent Simultaneous Sweeping in Libya-full scale implementation and new developments," SEG Houston 2009 International Exposition and Annual Meeting, pp. 109-111.

Jiang, Zhiyong, et al., "An analysis on the simultaneous imaging of simultaneous source data," 2010 SEG Denver 2010 Annual Meeting, pp. 31153119.

Abma, Ray, et al., "An Overview of BP's Marine Independent Simultaneous Source filed trials," SEG Las Vegas 2012 Annual Meeting, pp. 1-5.

Abma, Ray et al., "Popcorn shooting: Sparse inversion and the distribution of airgun array energy over time," SEG Houston 2013 Annual Meeting, pp. 31-35.

Alexander, Gino, et al., "Processing results of simultaneous source surveys compared to conventional surveys," SEG Houston 2013 Meeting, pp. 104108.

Zhang, Qie, et al., "A marine node simultaneous source acquisition trial at Atlantis, Gulf of Mexico," SEG Houston 2013 Annual Meeting, pp. 99-103.

* cited by examiner $$P'(z_d, z_s) = P(z_d, z_s)\Gamma$$

$$\underset{R \times L}{\underbrace{\begin{bmatrix} P'_{11} & P'_{12} & P'_{13} & \cdots & P'_{1L} \\ P'_{21} & P'_{22} & P'_{23} & \cdots & P'_{2L} \\ P'_{31} & P'_{32} & P'_{33} & \cdots & P'_{3L} \\ \vdots & \vdots & \vdots & \ddots & \vdots \\ P'_{R1} & P'_{R2} & P'_{R3} & \cdots & P'_{RL} \end{bmatrix}}_{801}} = \underset{R \times S}{\underbrace{\begin{bmatrix} P_{11} & P_{12} & P_{13} & \cdots & P_{1S} \\ P_{21} & P_{22} & P_{23} & \cdots & P_{2S} \\ P_{31} & P_{32} & P_{33} & \cdots & P_{3S} \\ \vdots & \vdots & \vdots & \ddots & \vdots \\ P_{R1} & P_{R2} & P_{R3} & \cdots & P_{RS} \end{bmatrix}}_{802}} \underset{S \times L}{\underbrace{\begin{bmatrix} \Gamma_{11} & \Gamma_{12} & \Gamma_{13} & \cdots & \Gamma_{1L} \\ \Gamma_{21} & \Gamma_{22} & \Gamma_{23} & \cdots & \Gamma_{2L} \\ \Gamma_{31} & \Gamma_{32} & \Gamma_{33} & \cdots & \Gamma_{3L} \\ \vdots & \vdots & \vdots & \ddots & \vdots \\ \Gamma_{S1} & \Gamma_{S2} & \Gamma_{S3} & \cdots & \Gamma_{SL} \end{bmatrix}}_{803}}$$

FIG. 8

$$\underset{30 \times 1}{\begin{bmatrix} P'_{11} \\ P'_{21} \\ P'_{31} \\ \vdots \\ P'_{30,1} \end{bmatrix}} = \underset{30 \times 6}{\begin{bmatrix} P_{11} & P_{12} & P_{13} & P_{14} & P_{15} & P_{16} \\ P_{21} & P_{22} & P_{23} & P_{24} & P_{25} & P_{26} \\ P_{31} & P_{32} & P_{33} & P_{34} & P_{35} & P_{36} \\ \vdots & \vdots & \vdots & \vdots & \vdots & \vdots \\ P_{30,1} & P_{30,2} & P_{30,3} & P_{30,4} & P_{30,5} & P_{30,6} \end{bmatrix}} \underset{6 \times 1}{\begin{bmatrix} \Gamma_{11} \\ \Gamma_{21} \\ \Gamma_{31} \\ \Gamma_{41} \\ \Gamma_{51} \\ \Gamma_{61} \end{bmatrix}}$$

FIG. 9

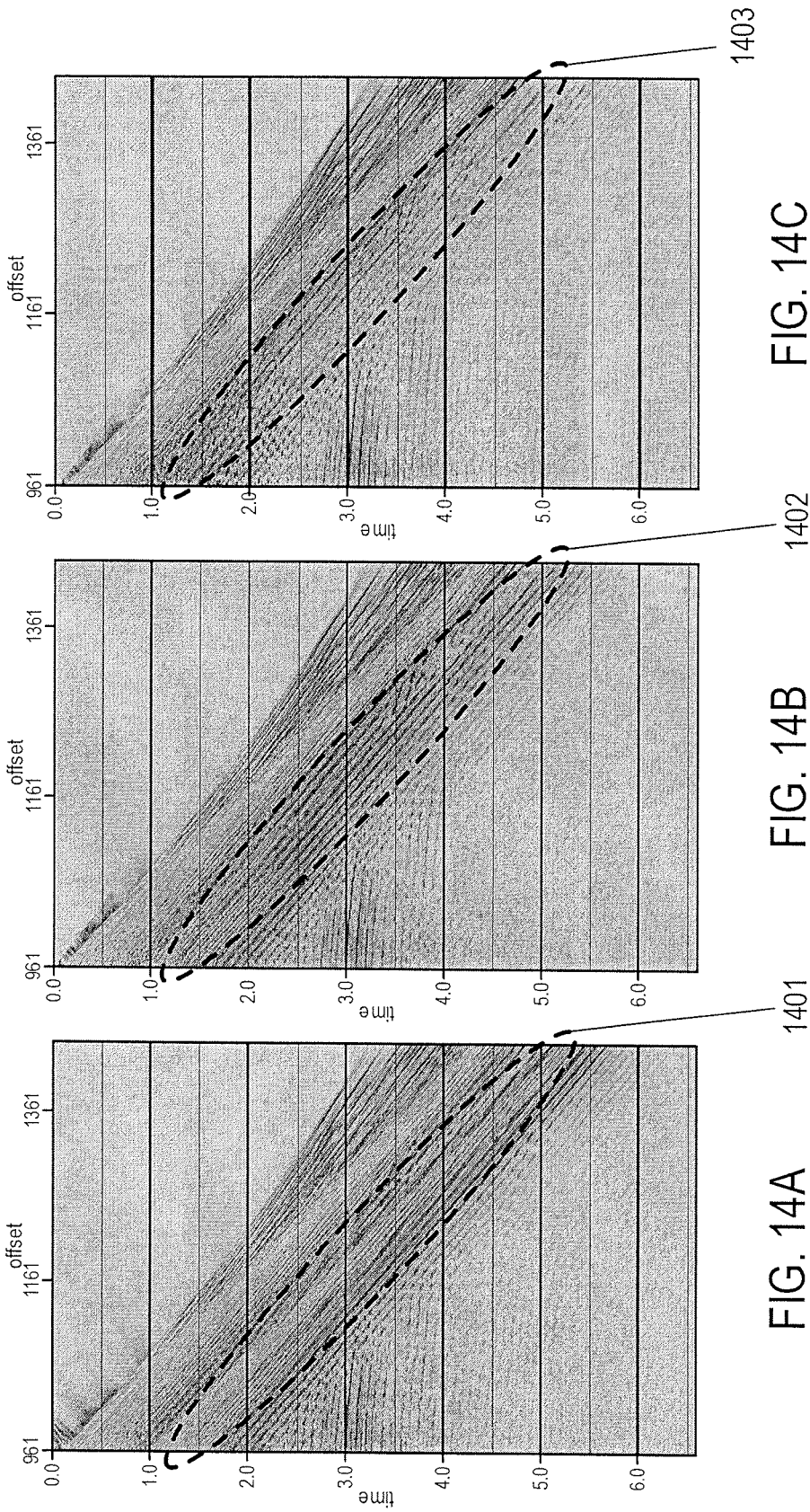

METHODS AND SYSTEMS FOR QUANTIFYING COHERENCY AND CONSTRAINING COHERENCY-BASED SEPARATION IN SIMULTANEOUS SHOOTING ACQUISITION

CROSS-REFERENCE TO RELATED APPLICATION

This application claims the benefit of provisional application No. 61/944,688, filed Feb. 26, 2014.

BACKGROUND

In the past few decades, the petroleum industry has invested heavily in the development of marine seismic survey techniques that yield knowledge of subterranean formations beneath a body of water in order to find and extract valuable petroleum resources. A typical marine seismic survey may be carried-out with a survey vessel towing a seismic source and the same vessel, or another vessel, towing one or more streamers that form a seismic data acquisition array below the surface of the water and above the subterranean formation. The survey vessel typically contains seismic data acquisition equipment, such as navigation control, seismic source control, seismic receiver control, and data recording equipment. The seismic source control activates a seismic source, which is typically an array of source elements, such as air guns or marine vibrators, that produces acoustic signals at selected times or at selected locations. Each acoustic signal is generally a sound wave that travels down through the body of water and into the subterranean formation. At interfaces between different types of rock, a portion of the sound wave is transmitted, a portion is refracted, and a portion is reflected back into the body of water to propagate toward the water surface. The streamers towed behind the survey vessel are elongated cable-like structures. Each streamer may include a number of seismic receivers or multi-component sensors that detect pressure and/or particle motion wavefields of the sound waves reflected back into the water from the subterranean formation. However, the wavefields measured by the receivers may also include seismic energy created by other active sources. This additional seismic energy may create seismic interference. Those working in the petroleum industry seek techniques to improve separation of seismic energy created by two or more sources.

DESCRIPTION OF THE DRAWINGS

FIG. 8 shows a mathematical representation of a relationship between blended and deblended seismic data.

FIG. 9 shows an example mathematical representation of a relationship between blended and deblended seismic data obtained using the example data acquisition system shown in FIG. 1.

FIGS. 14A-14C show results of seismic source separation applied for common-shot gathers.

DETAILED DESCRIPTION

Figure 1A:
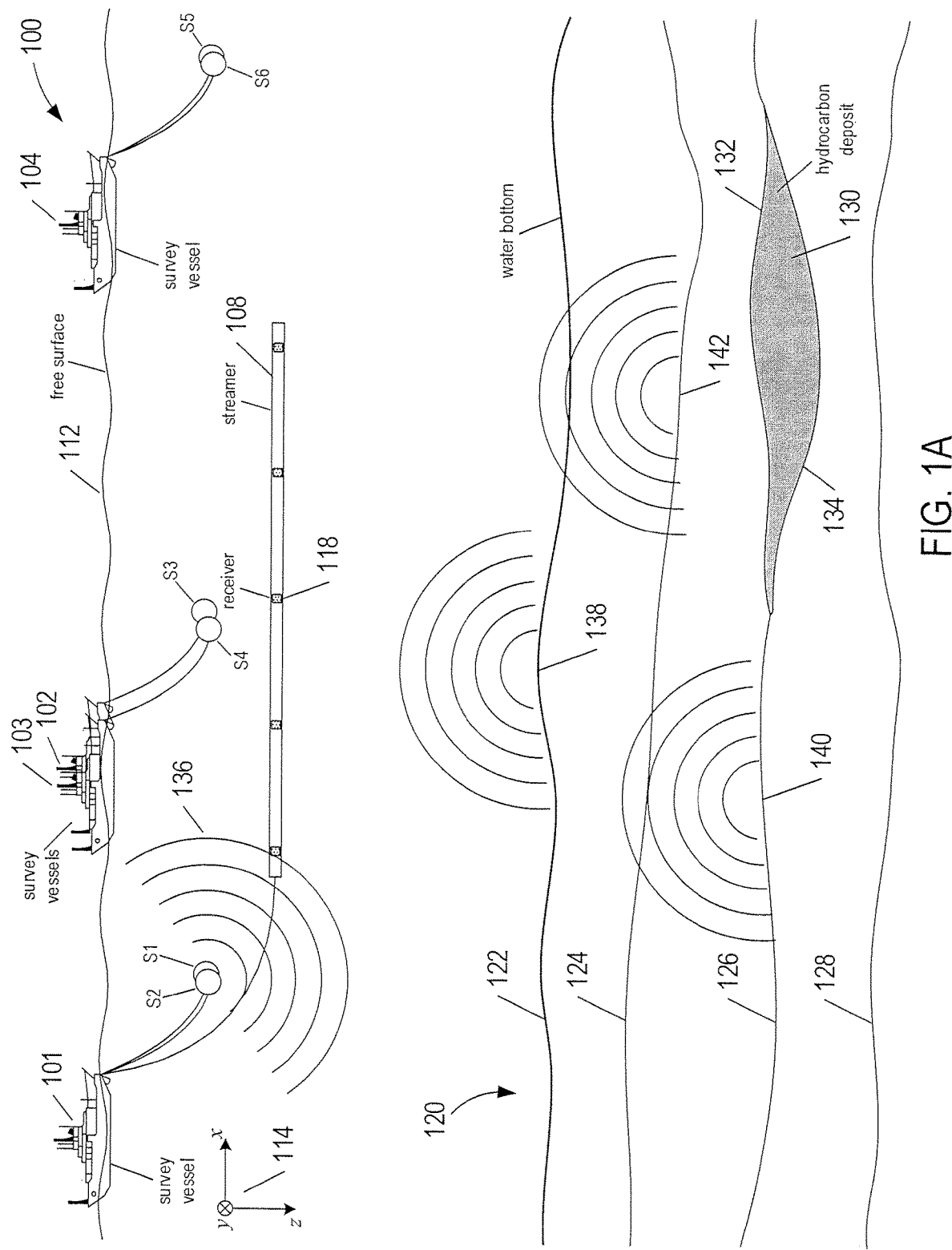
FIGS. 1A-1B show side-elevation and top views, respectively, of an example data acquisition system.

In simultaneous shooting acquisition ("SSA"), two or more sources are activated in succession with dithered time delays above a subterranean formation. The term "simultaneous" does not mean that the two or more sources are activated at exactly the same time. SSA refers to activation of the two or more sources with different time delays in a short time interval. As used herein, "simultaneous" shooting or activation means activating two or more sources within a short time interval that, for example, is small compared to the seismic recording period. Activation of the two or more sources within a short time interval may create interfering seismic energy emitted from the subterranean formation. A data acquisition system may record the interfering seismic energy as blended seismic data. One aim of SSA is to reduce the time to acquire seismic data and/or to increase the diversity of the seismic data in terms of fold, azimuth, and offsets. This disclosure presents methods and systems that may be used to deblend the blended seismic data into separate deblended seismic data gathers. Each deblended seismic data gather may be associated with one of the activated sources, and may appear to have been obtained without substantial interference from seismic energy produced by other sources.

Methods of the current disclosure iteratively separate the blended seismic data into deblended seismic data gathers over the individual sources. In some implementations, significant coherent energy content in the blended seismic data may be identified and separated. Once the significant coherent energy components have been identified and separated, coherent energy events that are strongly interfered with by incoherent energy may become better accessible and may be separated more easily in subsequent iterations. A coherency filter, such as a median filter, frequency-space deconvolution, tau-p filter, and a frequency-wavenumber filter, may be used to filter coherent energy in each iteration. Coherency filters are typically efficient when the coherent energy is greater than the interfering incoherent energy. Typical separation techniques may leave artifacts, such as energy leakage or smearing effects, that contaminate deblended seismic data gathers when these same coherency filters are applied to parts of blended seismic data with interfering incoherent energy that is greater than the coherent energy. On the other hand, methods of the current disclosure may produce deblended seismic data gathers that are substantially free of energy leakage or smearing effects by selectively applying the coherency filters to parts of the seismic data where coherent energy is greater than incoherent energy, and leave unfiltered other parts of the same seismic data identified as having interfering incoherent energy that is greater than the coherent energy. In subsequent iterations, when the interfering incoherent energy has been separated, the weaker coherent energy may be filtered/separated using the coherency filters.

Methods of the current disclosure use semblance analysis to better control the iterative separation process. Semblance analysis may be used to generate a semblance value for each sample of seismic data. The semblance value may give a level of coherent energy for the sample of seismic data and may be evaluated based on a threshold to determine whether or not a coherency filter should be applied to the sample of seismic data. For the first iteration, a semblance value of a sample of seismic data may be small because of strong interfering seismic energy, while in subsequent iterations, when much of the interfering energy has been reduced, the semblance value for the same sample may be increased. The threshold may be set as a user-defined process parameter. In certain implementations, one threshold may be used for the full iterative separation process in which the separation process stops when no more seismic data with a larger semblance value than the threshold is available. In other implementations, the threshold may be automatically adjusted as the number of iterations increases. In particular, a high threshold may be set at the beginning of the separation process in order to initially focus on the greatest coherent energy events in the seismic data followed by progressively decreasing the threshold as the number of iterations increases until the recorded seismic data is separated into the separate deblended seismic data gathers.

Figure 1B:
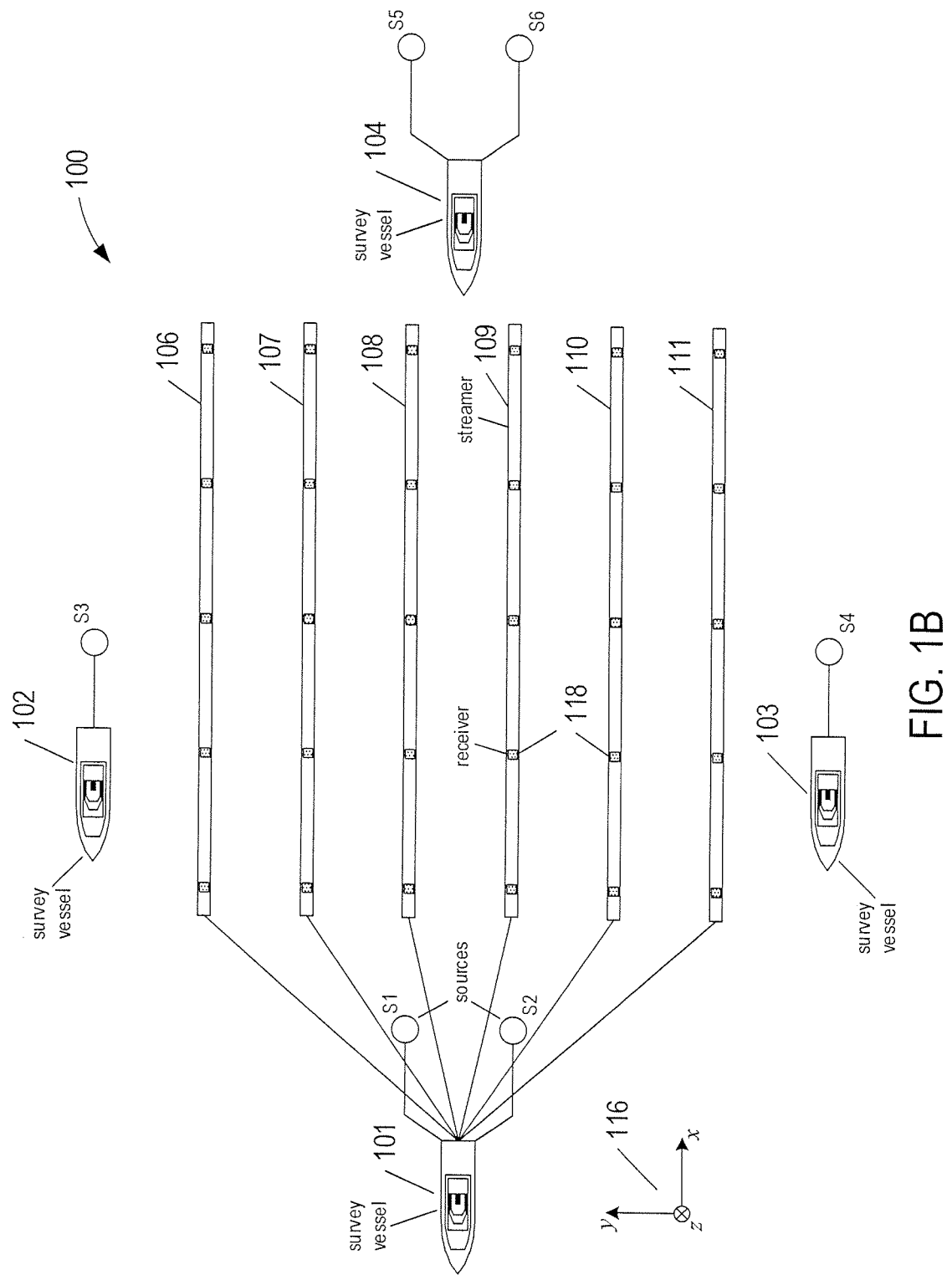

FIGS. 1A-1B show side-elevation and top views, respectively, of an example data acquisition system 100 that may be used for SSA. In this example, the data acquisition system is composed of four survey vessels 101-104 towing six sources denoted by S1, S2, S3, S4, S5, and S6. Survey vessel 101 also tows six separate streamers 106-111 beneath a free surface 112 of a body of water. The body of water can be, for example, an ocean, a sea, a lake, or a river, or any portion thereof. In this example, each streamer is attached at one end to the survey vessel 101 via a streamer-data-transmission cable. The illustrated streamers 106-111 form a planar horizontal data acquisition surface with respect to the free surface 112. It should be noted that the number of sources used in SSA is not limited to six sources. In practice, the number of sources S used in SSA may range from as few as two sources to more than six sources, such as ten or more sources, located at various positions in relation to the data acquisition surface. The data acquisition surface may also be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. A marine seismic survey may also be conducted with additional survey vessels (not show) towing additional data acquisition surfaces each with up to 20 or more streamers. For example, the additional data acquisition surfaces may be towed substantially parallel to the data acquisition surface towed by the survey vessel 101.

FIG. 1A includes an xz-plane 114, and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are generally long cables containing power and data-transmission lines that connect receivers 118 (represented by shaded rectangles) spaced-apart along the length of each streamer to seismic data acquisition equipment and data-storage devices that may be located on board the survey vessel 101.

Streamer depth below the free surface 112 may be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessels 101-104 towing the sources S1-S6 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. Each of the sources S1-S6 may be an air gun, marine vibrator, or composed of an array of air guns and/or marine vibrators. FIG. 1A illustrates an acoustic signal expanding outward from the source S1 as a pressure wavefield 136 represented by semicircles of increasing radius centered at the source S1. The outwardly expanding wavefronts from each of the sources may be spherical but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source S1 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source S1 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from each source as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
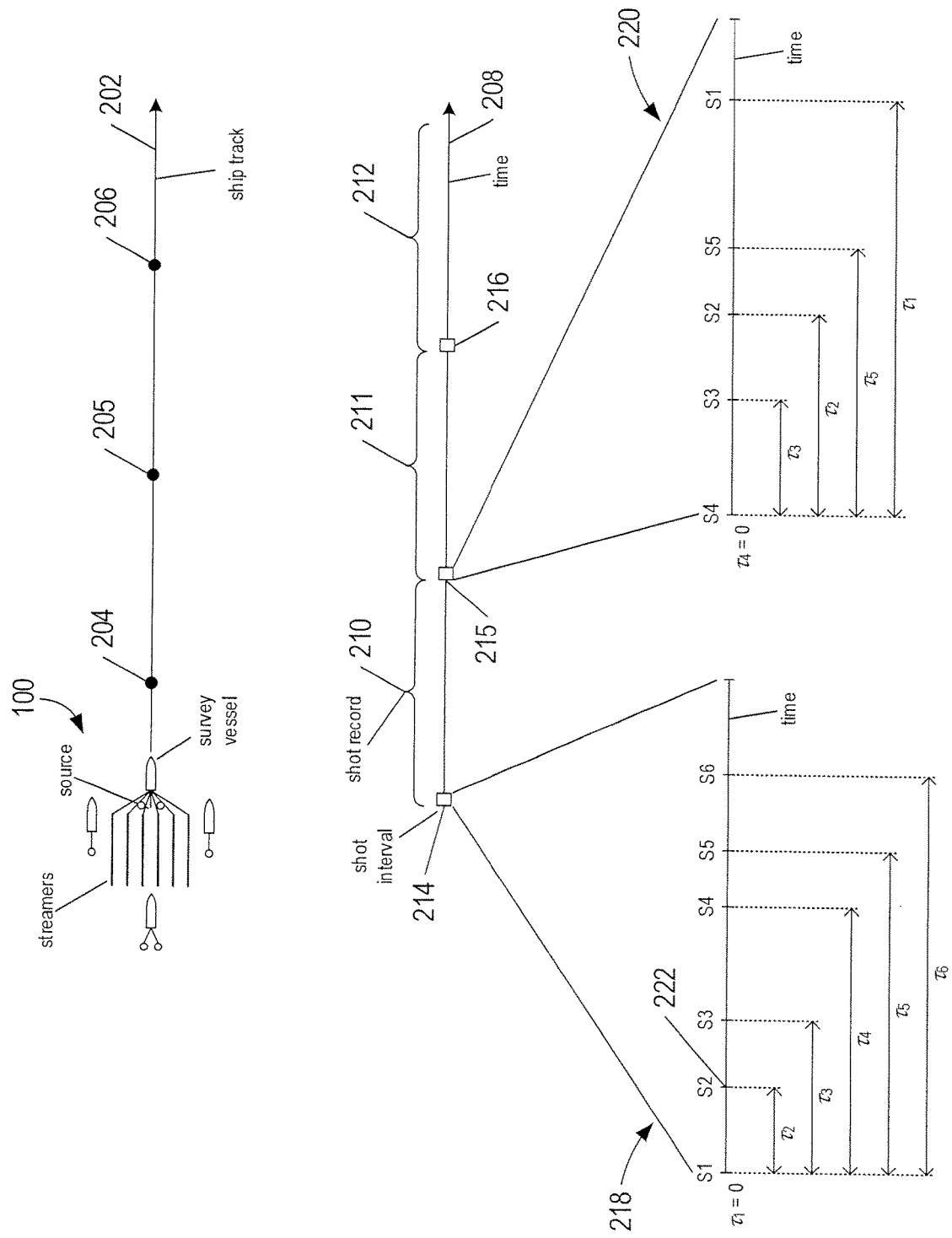
FIG. 2 shows an example of simultaneous shooting data acquisition.

FIG. 2 shows an example of carrying out SSA using the data acquisition system 100 traveling a ship track represented by a directional arrow 202. Two or more of the sources S1-S6 may be activated at locations represented by filled circles 204-206 as the data acquisition system 100 travels along the ship track 202. Directional arrow 208 represents a marine-seismic-survey-timeline that indicates when the sources S1-S6 are activated and when seismic data is recorded as the data acquisition system 100 travels the ship track 202. The example timeline 208 is segmented into recording periods 210-212. At the beginning of each of the recording periods 210-212, two or more of the sources S1-S6 are activated in shot intervals represented by boxes 214-216. For example, the shot intervals may have durations of approximately 1 second or longer and the recording periods may range from approximately 6-20 seconds. Seismic data may be recorded separately in each recording period or recorded continuously as the data acquisition system 100 travels the ship track 202. In other words, there may be no separation on the timeline 208 between two adjacent recording periods, or two adjacent recording periods may be separated by a pause period (not shown). Pause periods may have durations from less than a second to about 5 to 10 seconds.

In SSA, two or more of the sources S1-S6 are selected for activation within each shot interval. SSA refers to activation of the sources S1-S6 at different times within the same short shot interval, which may result in temporal overlap of seismic energy generated by each of the sources. As a result, the seismic data recorded in a recording period may be a record of interfering seismic energy produced by each activated source and is called "blended seismic data." Activating two or more of the sources S1-S6 in a single shot interval at randomly, pseudo-random, or patterned (e.g., sinusoidal time delay) activation times is called "dithering." Generally, two or more of the sources S1-S6 may be activated with a random, pseudo-random, or patterned time delay, $\tau_s$, (i.e., dithered time delay) after the beginning of the shot interval, where subscript s is a positive integer source index. For example, FIG. 2 includes example detailed views 218 and 220 of dithered source activation times in the shot intervals 214 and 215, respectively. The shot interval 214 begins when the source S1 is activated, which corresponds to a time delay of $\tau_1=0$. Marks, such as mark 222, indicate when the other five sources S2, S3, S4, S5, and S6 are activated with corresponding dithered time delays $\tau_2$, $\tau_3$, $\tau_4$, $\tau_5$, and $\tau_6$ after the start of the shot interval 214. In shot interval 215, not all of the sources are selected for activation and the order in which the sources are activated and associated time delays are different from those in shot interval 214. The sources selected for each activation in a shot interval is called a "source array." For example, the source array for shot interval 214 is composed of all the sources S1, S2, S3, S4, S5, and S6; and the source array for the shot interval 215 is composed of the sources S1, S2, S3, S4, and S5.

Figure 3:
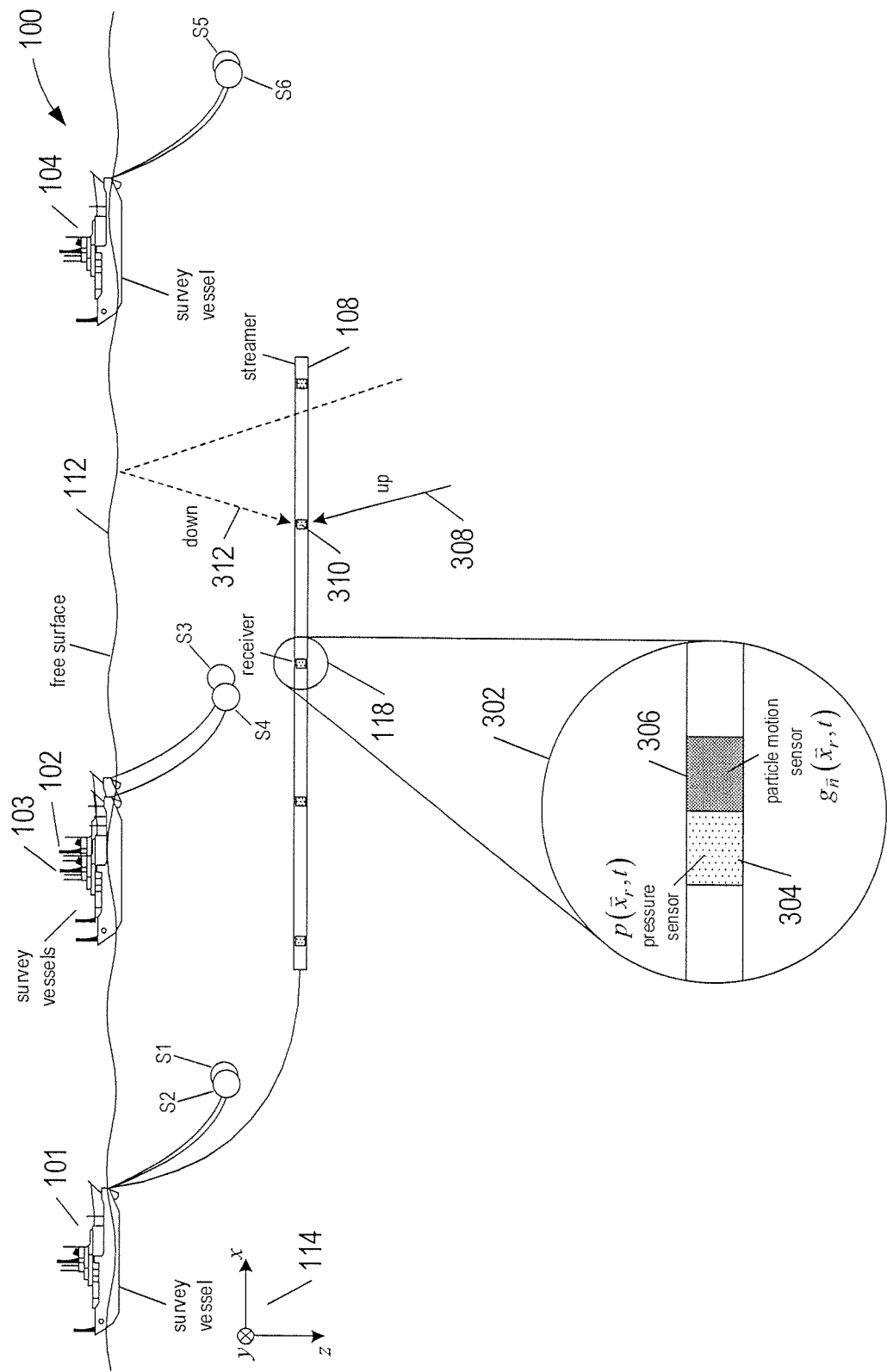
FIG. 3 shows a side-elevation view of a data acquisition system with a magnified view of a receiver.

Receivers 118 may include a particle motion sensor that detects particle motion, velocities, or accelerations over time, a pressure sensor that detects variations in water pressure over time, or a combination of particle motion and pressure sensors (i.e., a dual sensor). FIG. 3 shows a side-elevation view of the data acquisition system 100 with a magnified view 302 of an example receiver 118. In this example, the magnified view 302 reveals that the receiver 118 is a dual sensor composed of a pressure sensor 304 and a particle motion sensor 306. Each pressure sensor may measure changes in hydrostatic pressure over time and produces pressure data denoted by $p(\vec{x}, t)$, where $\vec{x}$ represents the Cartesian coordinates (x, y, z) of the receiver, and t represents time. The particle motion sensors may be responsive to water motion. In general, particle motion sensors detect particle motion in a direction normal to the orientation of the particle motion sensor and may be responsive to such directional displacement of the particles, velocity of the particles, or acceleration of the particles. The particle motion sensor data produced by the particle motion sensors may be converted to particle motion velocity data. For example, when particle motion sensors that are responsive to position are used, the particle motion sensor data denoted by $g_n(\vec{x}, t)$ may be differentiated to convert the data to particle motion velocity data denoted by $v_{\vec{n}}(\vec{x}, t)$, where unit normal vector $\vec{n}$ points in the direction particle motion is measured. Likewise, when particle motion sensors that are responsive to acceleration (i.e., accelerometers) are used, the particle acceleration data denoted by $a_{\vec{n}}(\vec{x}, t)$ may be integrated to convert the data to particle motion velocity data $v_{\vec{n}}(\vec{x}, t)$. The particle motion sensors are typically oriented so that the particle motion is measured in the vertical direction (i.e., $\vec{n}=(0,0,z)$) in which case $v_z(\vec{x}, t)$ is called the vertical velocity data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle motion in the z-direction to give $v_z(\vec{x}, t)$, each receiver may include a particle motion sensor that measures the wavefield in the in-line direction in order to obtain the inline velocity wavefield, t), and a particle motion sensor that measures the wavefield in the cross-line direction in order to obtain the cross-line velocity wavefield, $v_y(\vec{x}, t)$. In certain implementations, at least some of the receivers may by composed of only pressure sensors, and in other implementations, at least some of the receivers may be composed of only particle motion sensors.

The streamers 106-111 and the survey vessels 101-104 may include sensing electronics and data-processing facilities that allow seismic data generated by each receiver to be correlated with the times when the sources are activated, absolute positions on the free surface 112, and absolute three-dimensional positions with respect to an arbitrary three-dimensional coordinate system. The pressure data and particle motion data may be stored at the receiver and/or may be sent along the streamers and data transmission cables to the survey vessel 101, where the data may be stored electronically or magnetically on data-storage devices located onboard the survey vessel 101. The pressure data and particle motion data represent pressure and particle motion wavefields and, therefore, may also be called the pressure wavefield and particle motion wavefield, respectively.

In FIG. 3, directional arrow 308 represents the direction of an up-going wavefield at the location of receiver 310 and dashed-line directional arrow 312 represents a down-going wavefield produced by an up-going wavefield reflection from the free surface 112 before reaching the receiver 310. In other words, the pressure wavefield $p(\vec{x}, t)$ is composed of an up-going pressure wavefield component and a down-going pressure wavefield component, and the particle motion wavefield $g_{\vec{n}}(\vec{x}, t)$ is composed of an up-going wavefield component and a down-going wavefield component. The down-going wavefield contaminates pressure and particle motion data and creates notches in the seismic data spectral domain. Filtering may be done to remove the down-going wavefields from the pressure and particle motion data, leaving the up-going wavefields which are typically used to analyze the subterranean formation.

The seismic data measured by each pressure sensor or particle motion sensor may be a time series that consist of a number of consecutively measured values called amplitudes separated in time by a sample rate. The time series measured by a pressure or particle motion sensor is called a "trace," which may consist of thousands of samples collected at a typical sample rate of about 1 to 5 ms. A trace is generally a recording of a subterranean formation response to seismic energy that passes from an activated source, into the subterranean formation where a portion of the seismic energy is reflected, and ultimately detected by a sensor as described above. A trace records variations in a time-dependent amplitude that represents seismic energy in the portion of the wavefield measured by the sensor. In other words, each trace is a set of time-dependent pressure or particle motion sensor amplitudes denoted by $$tr(k) = \{A_k(t_b)\}_{b=1}^B \qquad (1)$$

where k is a trace index;
$A_k(t_b)$ is the amplitude of trace k at time sample $t_b$; and
B is the number of time samples.

As explained above, the wavefield typically arrives first at the receivers located closest to the sources. The distance from the sources to a receiver is called the "source-receiver offset," or simply "offset," which creates a delay in the arrival time of a secondary wavefield from a substantially horizontal interface within the subterranean formation. A larger offset generally results in a longer delay in the arrival time. The traces are collected to form a "gather" that can be further processed using various seismic data processing techniques in order to obtain information about the structure of the subterranean formation.

Figure 4:
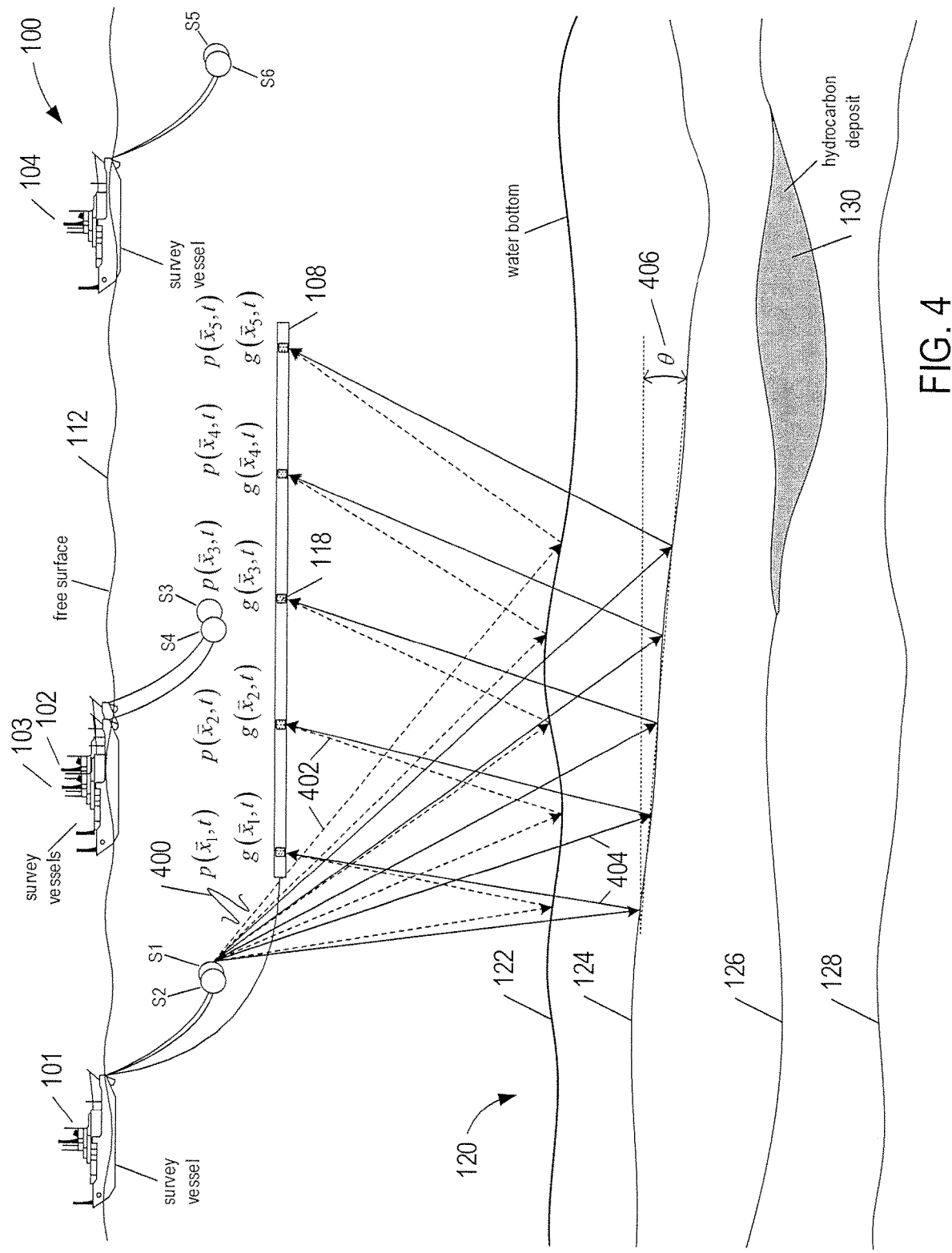
FIG. 4 shows example rays that represent acoustic signal paths output from a source.

FIG. 4 shows example rays that represent paths of an acoustic signal 400 output from the source S1. Dashed-line rays, such as rays 402, represent seismic energy reflected from the formation surface 122 to the receivers 118 located along the streamer 108, and solid-line rays, such as rays 404, represent seismic energy reflected from the interface 124 to the receivers located along the streamer 108. Note that for simplicity of illustration only a handful of ray paths are represented. Each pressure sensor may measure the hydrostatic pressure and each particle motion sensor may measure the particle motion of the seismic energy reflected from the subterranean formation 120 or interfaces therein. The hydrostatic pressure data and/or particle motion data generated at each receiver may be time sampled and recorded as separate traces. In the example of FIG. 4, the collection of traces generated by the receivers along the streamer 108 for a single activation of the source S1 may be collected to form a "common-shot gather" or simply a "shot gather." The traces generated by the receivers located along each of the other five streamers for the same activation may be collected to form separate shot gathers, each shot gather associated with one of the streamers.

Figure 5:
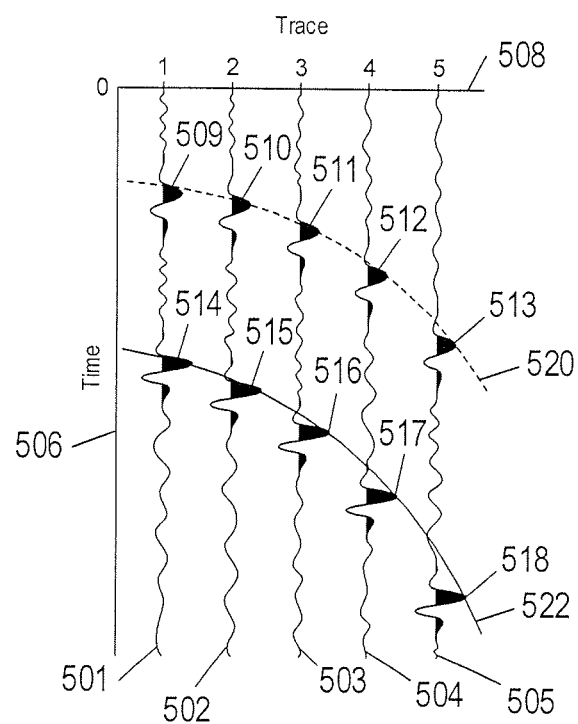
FIG. 5 shows an example shot gather with five traces.

FIG. 5 shows a plot of a shot gather composed of example traces 501-505 of the wavefield measured by the five receivers located along the streamer 108 shown in FIG. 4. Vertical axis 506 represents time and horizontal axis 508 represents trace numbers. The traces are arranged so that trace "1" represents the seismic data generated by the receiver located closest to the source S1 and trace "5" represents the seismic data generated by the receiver located farthest (along the length of the streamer) from the source S1. The traces 501-505 may represent variation in the amplitude of either the pressure data or the particle motion data measured by corresponding sensors of the five receivers. The example traces include wavelets or pulses 509-513 and 514-518 represented by peaks colored black that represent the up-going wavefield measured by the pressure sensors or particle motion sensors. The time intervals along the traces 501-505 from the trace number axis 508 (i.e., time zero) to the wavelets 509-513 represents two-way travel time of the seismic energy output from the source S1 to the formation surface 122 and to the receivers located along the streamer 108, and the wavelets 514-518 represent longer two-way travel time of the seismic energy output from the source S1 to the interface 124 and to the same receivers located along the streamer 108. The amplitudes of the peaks or troughs of the wavelets 509-513 and 514-518 indicate the magnitude of the reflected seismic energy measured by the receivers.

The arrival times versus source-receiver offset is longer with increasing source-receiver offset. As a result, the wavelets generated by a surface or an interface are collectively called a "reflected wave" or simply "reflection" that tracks a parabolic-shaped curve. For example, dashed curve 520 represents the distribution of the wavelets 510-513 reflected from the formation surface 122, which are called a "surface reflected wave" or "water bottom reflection" and solid parabolic curve 522 represents the distribution of the wavelets 511-515 from the interface 124, which are called an "interface reflected wave" or "interface reflection."

Figure 6:
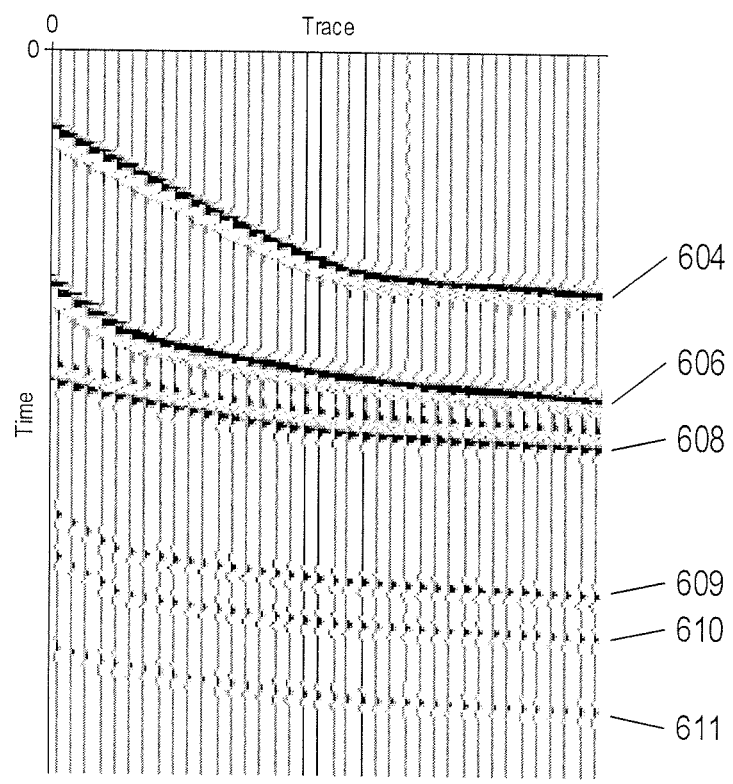
FIG. 6 shows an example of a gather with thirty-eight traces.

FIG. 6 shows an example of a gather composed of 38 traces. Each trace, such as trace 602, varies in amplitude over time and represents seismic energy reflected from the surface and five different interfaces within a subterranean formation as measured by a pressure sensor or a particle motion sensor. In the expanded view, wavelets that correspond to reflection from the same surface or interface of the subterranean formation appear chained together. For example, wavelets 604 with the shortest transit time represent a water bottom reflection, and wavelets 606 represent an interface reflected wave emanating from an interface just below the surface. Reflected waves 608-611 represent reflections from interfaces located deeper within the subterranean formation.

The gathers shown in FIGS. 5 and 6 are described for seismic data sorted into a common-shot domain (or simply the shot domain). A domain is a collection of gathers that share a common attribute with respect to the seismic data recording locations. The seismic data may be sorted into any suitable domain for examining the features of a subterranean formation including, for example, a common-receiver domain, common-receiver-station domain, or common-midpoint ("CMP") domain.

Figure 7:
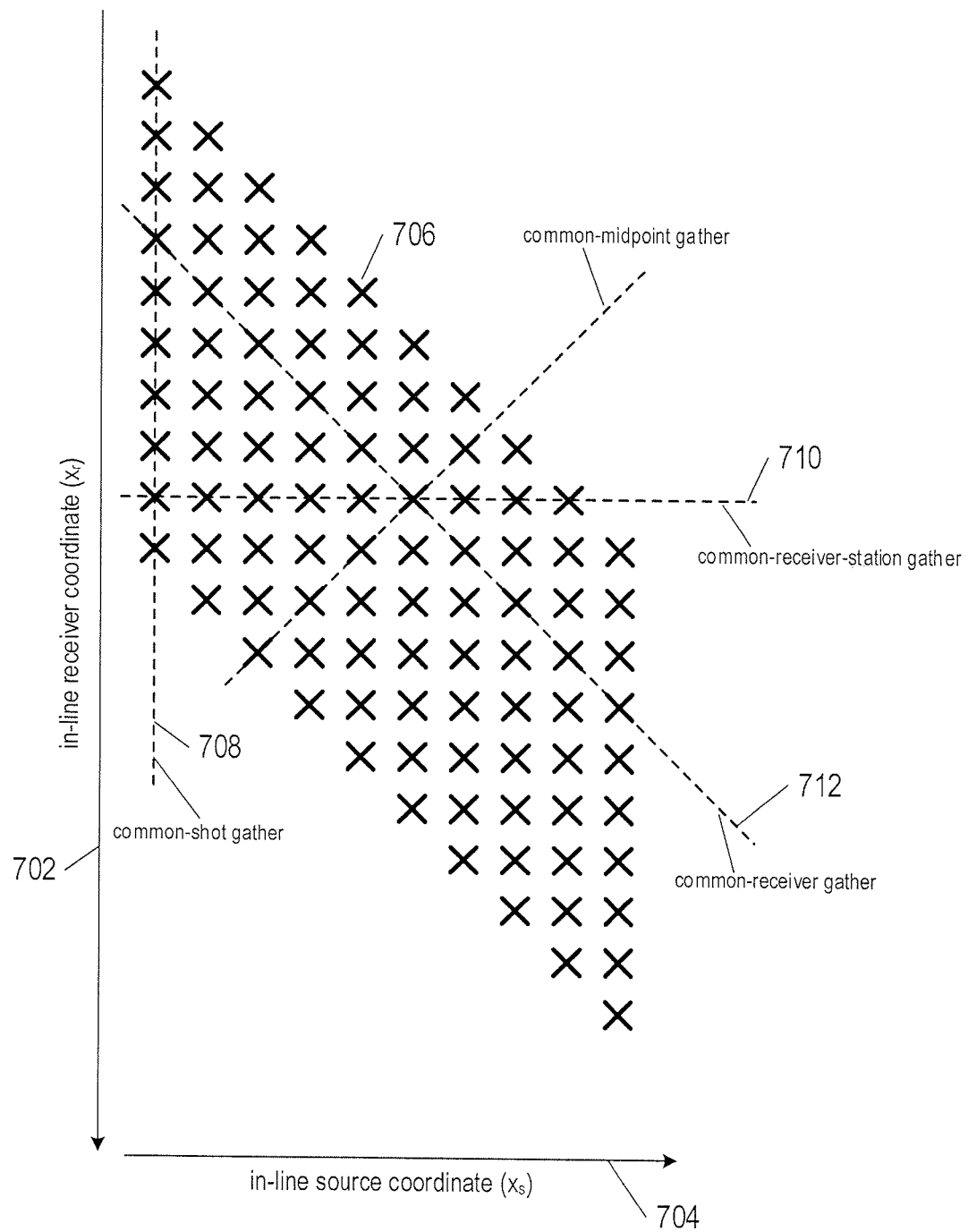
FIG. 7 shows a plot of different ways seismic data may be sorted into domains.

FIG. 7 shows a plot of different ways seismic data collected in a survey may be sorted into domains. Vertical axis 702 represents the in-line receiver coordinates and horizontal axis 704 represents the in-line source coordinates. X's, such as X 706, represent where a recording (i.e., pressure or particle motion) has taken place. In this plot, a column of recordings identified by dashed line 708 represents a shot gather, and a row of recordings identified by dashed line 710 represents a common-receiver-station gather. Recordings collected along a diagonal represented by dashed line 712 is a common-receiver gather, and recordings collected along a diagonal represented by dashed line 714 is a CMP gather. The gathers form different domains. For example, the shot gathers form a shot domain, the common-receiver gathers form a common-receiver domain, the common-receiver-station gathers form a common-receiver-station domain, and the CMP gathers form a CMP domain. Certain domains are orthogonal. For example, as shown in FIG. 7, the gathers in the shot domain are orthogonal to the gathers in the common-receiver domain.

Seismic data processing may include correction of the effects of different source-receiver offsets using a process called "normal moveout" ("NMO") or a process called "linear moveout" ("LMO") and correction of angled interfaces in a process called "dip moveout" ("DMO"). A dip is an angle of inclination with respect to a horizontal plane. For example, in FIG. 4 angle θ 406 represents a dip angle below horizontal. NMO and DMO corrections have the effect of flattening out the parabolic-shaped reflections and may be applied as follows. Prior to NMO and DMO corrections NMO velocity analysis may be performed on a gather, such as a CMP gather, to determine a regional velocity model. A first NMO correction may be applied to the data using the regional velocity model followed by application of a DMO correction. An inverse NMO correction may be applied using the regional velocity function followed by performing a more detailed NMO velocity analysis to determine a detailed velocity model. Finally, NMO correction may be applied again using the detailed velocity model to give a gather with flatten reflections. After NMO and DMO corrections have been performed to flatten the reflections, traces from different shot records with a common reflection point may be stacked to form a single trace during seismic data processing. For example, NMO and DMO corrections may be applied to CMP gathers followed by stacking in order to improve the signal-to-noise ratio, reduce noise, improve seismic data quality, and reduce the amount of data. LMO may be used with an average source-to-receiver velocity model.

Dithered activation of two or more seismic sources as described above with reference to FIG. 2 allows for the attenuation of the seismic energy from interfering sources after sorting the acquired seismic data to an appropriate domain, such as the domains described above with reference to FIG. 7. After sorting to an appropriate domain, the seismic data associated with one of the sources (i.e., the primary source) may be aligned with time zero and appears coherent, while the seismic data associated with the one or more other sources (i.e., secondary sources) appears incoherent. As a result, methods that discriminate between coherent and incoherent energy allow for the sources to be separated.

As explained above, blended seismic data is composed of interfering seismic energy emitted from a subterranean formation for each of the two or more source activations. Methods and systems separate, or "deblend," the blended seismic data into separate deblended seismic data gathers (i.e., deblended gathers) that are each associated with activation of one of the two or more sources as if each deblended gather is generated without substantial interference from seismic energy generated by the other sources. For example, a frequency-domain mathematical relationship between the blended seismic data and the deblended gathers may be represented as follows:

$$P'(z_r, z_s) = P(z_r, z_s)\Gamma \qquad (2)$$

where $P'(z_r, z_s)$ is a frequency-domain blended seismic data matrix;
  $P(z_r, z_s)$ is a frequency-domain deblended seismic data matrix;
  $\Gamma$ is a frequency-domain blending matrix; and
  $z_r$ and $z_s$ are the receiver and source depth levels, respectively.

FIG. 8 shows a more detailed mathematical representation of the matrices of Equation (2). Matrix 801 represents the matrix $P'(z_r, z_s)$ of blended seismic data, matrix 802 represents matrix $P(z_r, z_s)$ of deblended seismic data, and matrix 803 represents blending matrix $\Gamma$. Blended seismic data matrix $P'(z_r, z_s)$ 801 is an R×L matrix, deblended seismic data matrix $P(z_r, z_s)$ 802 is an R×S matrix, and blending matrix Γ 803 is an S×L matrix, where R represents the total number of receivers in the data acquisition surface, S is the total number of sources, and L is the number of sources arrays activated in a survey. Consider elements $P_{rs}$ of the deblended seismic data matrix $P(z_r, z_s)$ 802. Each element $P_{rs}$ represents a deblended trace, where subscript r is an integer receiver index $1 \leq r \leq R$, and subscript s is an integer source index $1 \leq s \leq S$. Each row in the deblended seismic data matrix $P(z_r, z_s)$ 802 corresponds to a different receiver and each column corresponds to a different source. For example, matrix elements $P_{11}$, $P_{12}$, and $P_{13}$ in row 804 represent traces generated by receiver 1 as a result of separate, or deblended, seismic energy generated by corresponding sources S1, S2, and S3. Matrix elements $P_{11}$, $P_{21}$, and $P_{31}$ in column 805 represent traces generated by receivers 1, 2, and 3 as a result of separate, or deblended, seismic energy generated by the source S1. Consider matrix elements $P_{sl}$ of the blending matrix Γ 803, where subscript l is an integer source array index $1 \leq l \leq L$. Because each recording period has a different source array, the subscript l may be used as a recording period index. For surveys with dithered activation times and sources with substantially equal seismic energy output, the matrix elements of the blending matrix Γ 803 are time-delay phase given by $\delta_{sl} = \exp(-j\omega\tau_{sl})$, where $\tau_{sl}$ is the time delay for source s in source array l. Each row in the blending matrix Γ 803 corresponds to a different source and each column corresponds to a different source array. Finally, consider matrix elements $P'_{rl}$ in blended seismic data matrix $P'(z_r, z_s)$ 801. Each element $P'_{rl}$ represents a trace generated by a receiver r as a result of seismic energy produced by a source array l. Each column in the blended seismic data matrix $P'(z_r, z_s)$ 801 is composed of R blended traces generated by all R receivers of the data acquisition surface in a recording period as a result of activating a particular source array. Traces in the blended seismic data matrix $P'(z_r, z_s)$ 801 may be sorted into different domains by selecting a particular set of traces that correspond to the domain. For example, common-shot gathers are created by selecting traces in the same column; common-receiver gathers are created by selected traces along a diagonal.

FIG. 9 shows a specific example of a matrix equation that may be obtained using the data acquisition system 100 in a single recording period. As shown in FIG. 1B, the example data acquisition system 100 contains R=30 receivers and S=6 sources. Returning to FIG. 9, blending matrix 901 is obtained from the time delays determined after the beginning of a shot interval. For example, the source array for the shot interval 215 in FIG. 2 is composed of sources S1, S2, S3, S4, and S5 with associated time delays $\tau_{11}, \tau_{21}, \tau_{31}, \tau_{41}=0$ (i.e., the shot interval starts with activating source S4), and $\tau_{51}$. The corresponding frequency-domain blending matrix 901 is given by $$\Gamma = \begin{bmatrix} \Gamma_{11} \\ \Gamma_{21} \\ \Gamma_{31} \\ \Gamma_{41} \\ \Gamma_{51} \\ \Gamma_{61} \end{bmatrix} = \begin{bmatrix} \exp(-j\omega\tau_{11}) \\ \exp(-j\omega\tau_{21}) \\ \exp(-j\omega\tau_{31}) \\ 1 \\ \exp(-j\omega\tau_{51}) \\ 0 \end{bmatrix} \qquad (3)$$

Note that because the source S6 is not activated in the source array, the corresponding matrix element $\Gamma_{61}$ is equal to zero. Blended seismic data matrix 902 is composed of 30 traces generated by all 30 receivers as a result of activating an array of sources with time delays represented in the blending matrix 901. Elements $P_{rs}$ of the deblended seismic data matrix 903 represent recorded seismic energy generated by a source s and measured at a receiver r without interference of seismic energy generated by the other five sources.

Returning to FIG. 8, the traces in the blended seismic data matrix $P'(z_r, z_s)$ 801 are obtained from recording seismic data at the receivers and elements of the blending matrix Γ 803 are determined from the known times when the sources are activated in a shot interval. In the frequency domain, Equation (2) indicates that each blended trace element in the blended seismic data matrix $P'(z_r, z_s)$ 801 is a linear combination of a row of deblended traces in deblended seismic data matrix $P(z_r, z_s)$ 802 and a column of phase terms in the blending matrix Γ 803:

$$P'_{rl} = \sum_{s=1}^{S} P_{rs} \Gamma_{sl} \qquad (4)$$

However, the traces $P_{rs}$ in the deblended seismic data matrix $P(z_r, z_s)$ 802 are unknown and may not be measured in isolation. Ideally, traces in deblended seismic data matrix $P(z_r, z_s)$ 802 may be determined from matrix inversion:

$$P(z_r, z_s) = P'(z_r, z_s)\Gamma^{-1} \qquad (5)$$

where $\Gamma^{-1}$ is an inverse blending matrix of the blending matrix Γ.

However, in practice, it may be the case that the matrix equation in Equation (2) cannot be solved with matrix inversion according to Equation (5) because the matrix equation in Equation (2) is underdetermined (i.e., L<R). In cases where L<R, the blending matrix Γ is not invertible and a unique deblended seismic data matrix $P(z_r, z_s)$ 802 does not exist.

Because the deblended seismic data matrix P may not be directly determined from matrix inversion, methods of the current application iteratively determine a deblended data matrix M, which is an approximation or model of the deblended seismic data matrix P. The deblended data matrix M may be determined from a residual equation that characterizes the closeness of a blended seismic data matrix P' to the deblended data matrix M with time delays represented by blending matrix Γ:

$$RES = P' - M\Gamma \qquad (6)$$

Figure 10:
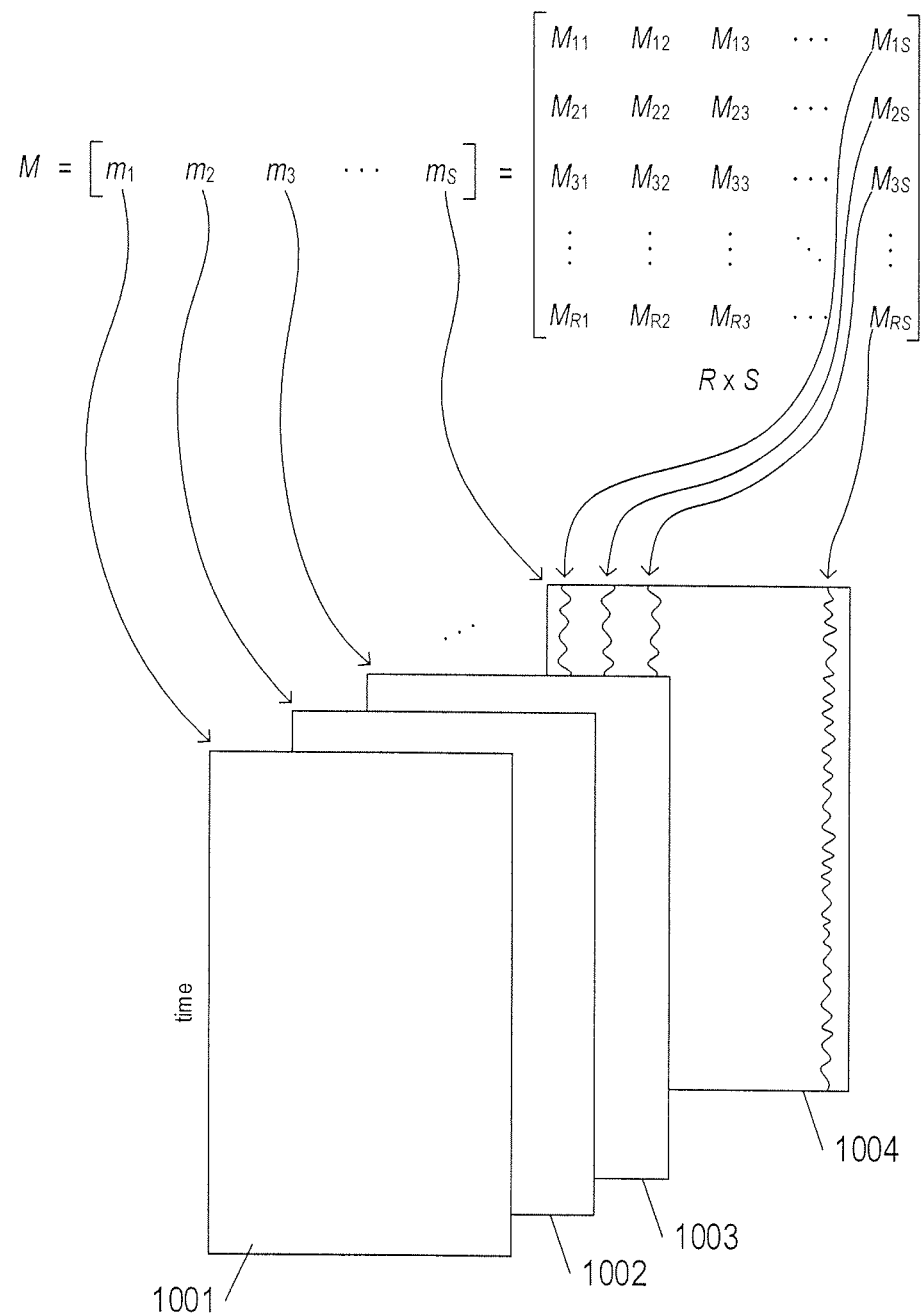
FIG. 10 shows an example of a deblended data matrix.

An example of a deblended data matrix M is an R×S matrix illustrated in FIG. 10 and is an approximation of the deblended seismic data matrix P. Each element in the deblended data matrix M is a deblended trace denoted by $M_{rs}$. The columns of the deblended data matrix M are denoted by $m_s$ and each column is a deblended gather associate with activation of one source s. Each deblended gather $m_s$ is an approximation or model of seismic data measured for one source of a source array activated in a shot interval without interfering seismic energy created by the other sources in the source array. For example, rectangles 1001-1004 represent S deblended gathers $m_1$, $m_2$, $m_3$, and $m_s$. Each deblended gather $m_s$ is a column of R traces in the deblended data matrix M. For example, as shown in FIG. 10, deblended gather $m_s$ 1004 is composed of the column of traces $M_{rs}$, where $1 \leq r \leq R$.

The magnitude of the residual RES may be iteratively minimized while also iteratively constructing the deblended data matrix M by redefining the residual in Equation (6) as an iterative equation:

$$RES_i = P' - M_i \Gamma \quad (7)$$

where subscript i is a non-negative integer iteration index; and $M_i = [m_{1,i}\ m_{2,i}\ m_{3,i}\ \ldots\ m_{s,i}]$ with each $m_{s,i}$ is a deblended gather associated with activation of a source s.

In the time domain, the iterative equation represented by Equation (7) becomes:

$$res_i = \hat{P}' - \hat{M}_i * \hat{\Gamma} \quad (8)$$

where $\hat{P}'$ is a time-domain blended seismic data matrix;

$\hat{M}_i$ is a time-domain deblended data matrix characterized by $\hat{M}_i = [\hat{m}_{1,i}\ \hat{m}_{2,i}\ \hat{m}_{3,i}\ \ldots\ \hat{m}_{S,i}]$ with each $\hat{m}_{s,i}$ a time-domain deblended gather associated with activation of a source s;

$\hat{\Gamma}$ is a time-domain blending matrix;

$res_i$ is a time-domain residual; and

* represents convolution.

Figure 11:
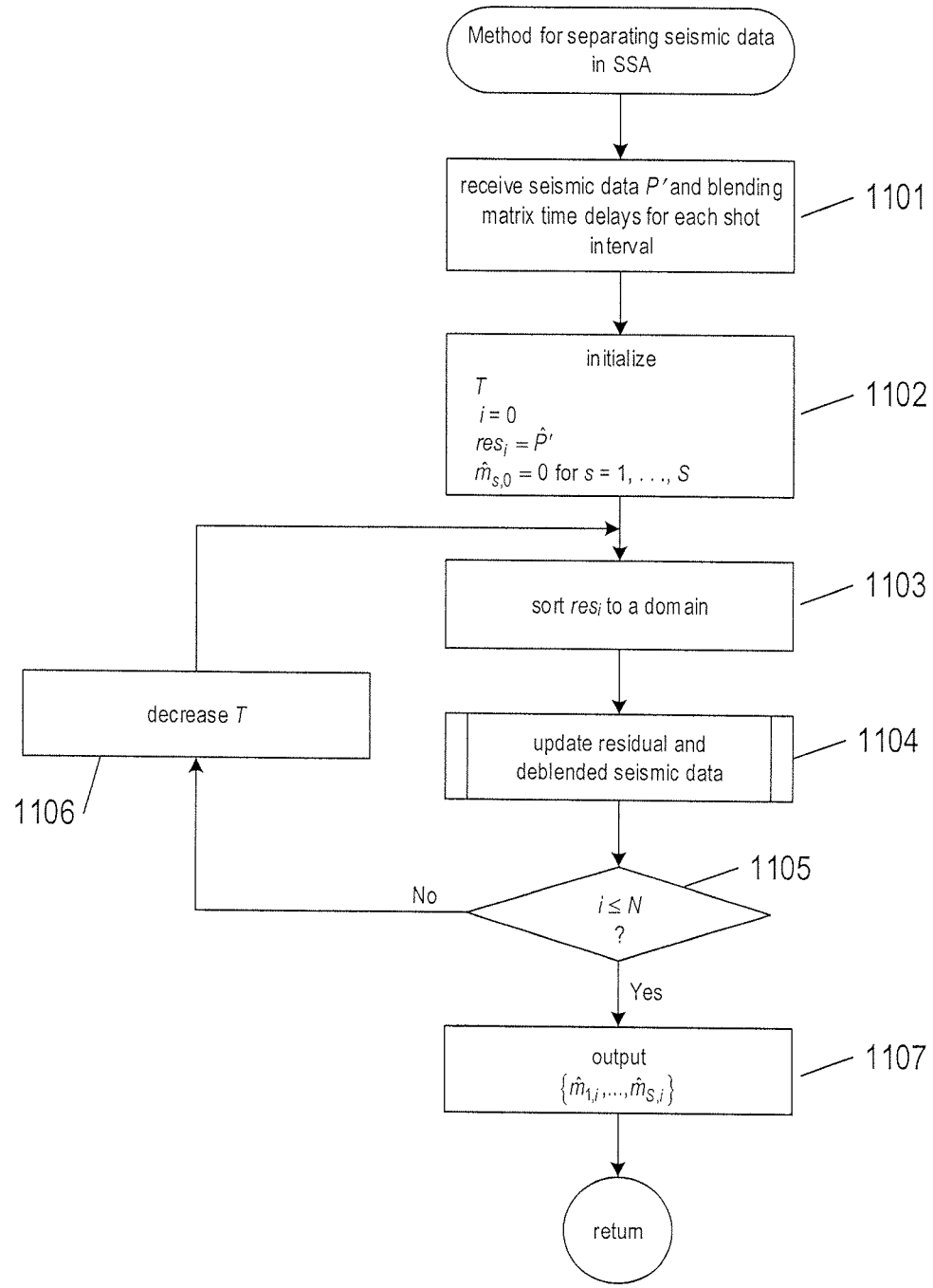
FIG. 11 shows an example flow-control diagram of an iterative method for separating seismic data obtained using simultaneous shooting acquisition.
Figure 12:
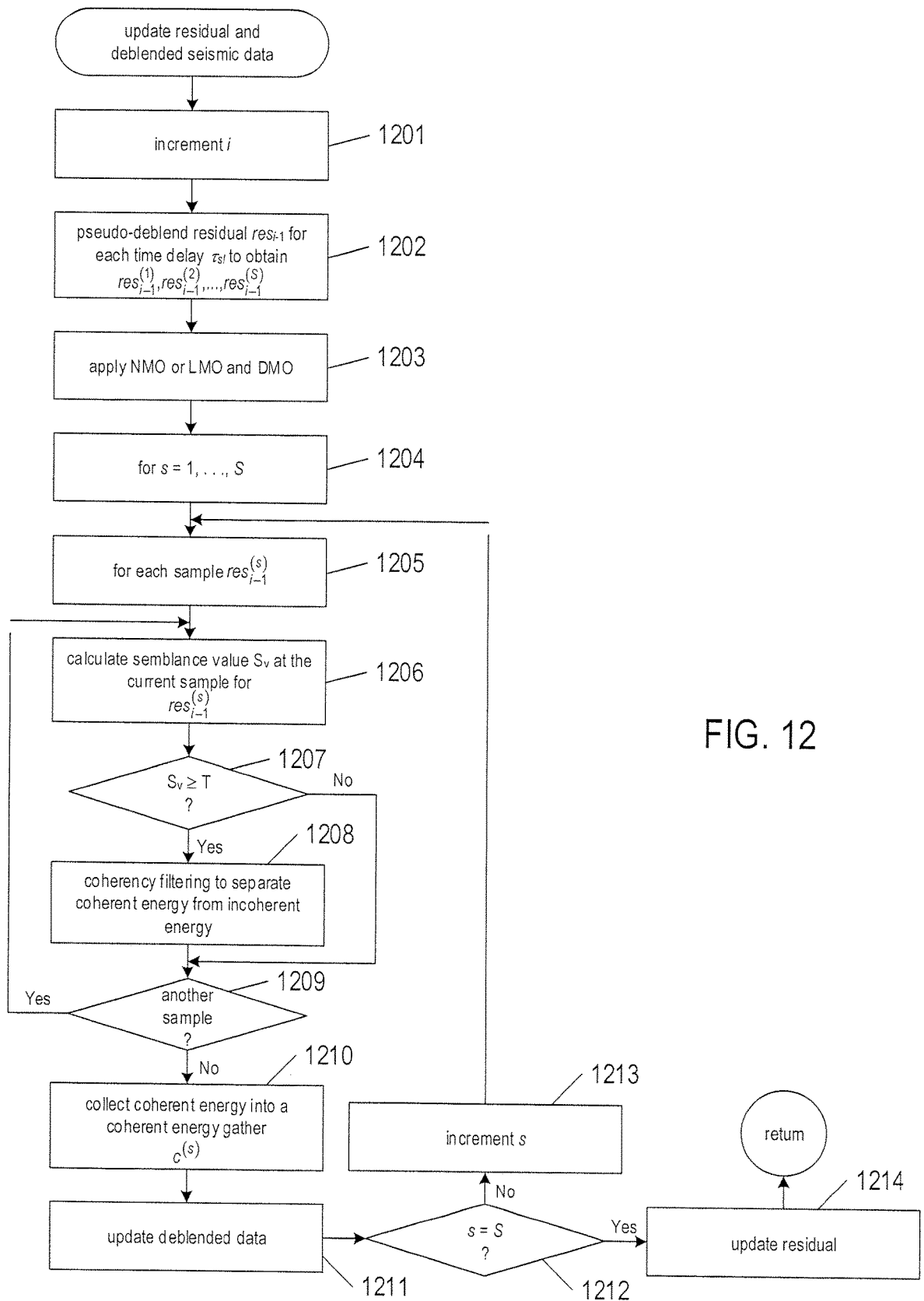
FIG. 12 shows a flow-control diagram for a routine "update residual and deblended seismic data" called in the flow-control diagram of FIG. 11.

FIGS. 11 and 12 present an example method for separating blended seismic data $\hat{P}'$ obtained using SSA in the time domain. FIG. 11 shows an example flow-control diagram of an iterative method for separating seismic data obtained using SSA. In block 1101, blended seismic data $\hat{P}'$ may be received, wherein blended seismic data $\hat{P}'$ represents energy measured by receivers of a data acquisition surface in L recording periods. Block 1101 also includes receiving the time delays $\tau_{sl}$ associated with activation of a source array in each shot interval of the L recording periods.

In block 1102, parameters are initialized. The iteration index i is initialized to zero (i.e., i=0) and the residual for i=0 is initialized to the blended seismic data matrix:

$$res_0 = \hat{P}' \quad (9)$$

and the deblended data matrix is initialized to $$M_0 = [\hat{m}_{1,0}\ \hat{m}_{2,0}\ \hat{m}_{3,0}\ \ldots\ \hat{m}_{S,0}] = [0\ 0\ 0\ \ldots\ 0] \quad (10)$$

which represents the amplitudes of each deblended trace in the initial deblended data matrix $\hat{M}_0$ are initialized to zero (i.e., $\hat{M}_{r,s} = 0$, for $1 \leq r \leq R$ and $1 \leq s \leq S$). Parameter initialization also includes initializing a semblance-value threshold, T, to a value in the interval $0 < T \leq 1$. The semblance-value threshold T may be input to a routine called in block 1104. For example, the threshold may be initialized to 0.6. In certain implementations, the threshold T may be fixed for each iteration. In other implementations, the threshold may be changed after each iteration. For the particular implementation illustrated in FIG. 11, the operations executed in blocks 1103-1106 include changing the threshold in block 1106 as explained below.

In block 1103, the residual $res_i$ may be sorted into a particular domain, such as any one of the domains described above with reference to FIG. 7. For example, for each iteration i, the residual $res_i$ may be sorted into the common-receiver domain. In other implementations, the residual $res_i$ may be sorted into different domains for certain iterations. For example, for the first iteration with i=0 the residual $res_0$ may be sorted into the common-receiver domain, and in a subsequent iteration with i=1, the residual $res_1$ may be sorted into the CMP domain.

In block 1104, a subroutine "update residual and deblended seismic data gathers" may be called to receive as input the residual and the set of deblended gathers and output an updated residual and an updated set of deblended gathers as described below with reference to FIG. 12. In decision block 1105, when the iteration index i is greater than a user selected number of iterations, N, control flows to block 1107 in which the most recent set of deblended gathers $\{\hat{m}_{s,i}\}_{s=1}^{S}$ is output. Each gather $m_{s,i}$ output in block 1107 may be substantially free of seismic energy contamination from other sources. Otherwise, control flows to block 1106. In block 1106, the semblance-value threshold T is decreased. For example, the threshold T may be initialized to a value 0.6 for iteration i=0 decreased to a value 0.4 for iteration i=1 and further decreased to a value 0.2 for iteration i=2.

Implementations are not limited to using a fixed number of iterations N to determine when the iteration process in blocks 1103-1106 ends in decision block 1105. In other implementations, the decision in decision block 1105 to end the iterative process in blocks 1103-1106 may be based on when the magnitude of the difference between a current residual $res_i$ and a previous residual $res_{i-1}$ is less than a selected residual threshold, $T_r$. For example, the decision block 1105 may be implemented as follows. When $$T_r \geq \|res_i - res_{i-1}\| \quad (11)$$

control flows to block 1107, otherwise, control flows to block 1106.

FIG. 12 shows a flow-control diagram for the routine "update residual and deblended seismic data" called in block 1104 of the flow-control diagram of FIG. 11. In block 1201, the iteration index i is incremented. In block 1202, pseudo-deblending of the residual $res_{i-1}$ may be performed for each time delay $\tau_{si}$ by subtracting the time delay from each trace of the residual $res_{i-1}$ to give a corresponding pseudo-deblended residual $res_{i-1}^{(s)}$. Pseudo-deblending the residual may be performed for each activated source to give a set of pseudo-deblended residuals:

$$res_{i-1}^{(1)}\ res_{i-1}^{(2)}\ res_{i-1}^{(3)},\ \ldots,\ res_{i-1}^{(s)} \quad (12)$$

Pseudo-deblending creates pseudo-deblended residuals $res_{i-1}^{(s)}$ that are each aligned in time with a time delay $\tau_{sl}$. In other words, each pseudo-deblended residual $res_{i-1}^{(s)}$ is aligned in time with a gather $m_{s,i-1}$. In block 1203, velocity analysis and NMO or LMO and DMO corrections may be applied as described above. In particular, when the seismic data is sorted into the CMP domain in block 1103 of FIG. 11, velocity analysis, NMO, and DMO may be applied to flatten reflectors.

The diagram in FIG. 12 includes an outer for-loop beginning in block 1204 repeats the operations represented by blocks 1205-1212 for each of the S sources activated in the shot interval. An inner for-loop beginning in block 1205 repeats the operations represented by blocks 1206-1209 for each time sample $t_b$ described above with reference to Equation (2).

In block 1206, semblance values $S_v(t_b)$ may be calculated for each time sample level $t_b$. For example, let tr denote the number of traces in the pseudo-deblended residual $res_{i-1}^{(s)}$, and let $a_k(t_b)$ be the amplitude of trace k at time sample level $t_b$ in pseudo-deblended residual $res_{i-1}^{(s)}$. In one implementation, the semblance value $S_v(t_b)$ may be calculated using overlapping windows that are Q traces wide for each time sample level $t_b$ according to the following pseudo-code:

set window width $Q$ to an odd number of traces $(Q < tr)$;  (13)

for each time sample level $t_b$;

for each $q = 1, \ldots, tr$;

$$S_v(t_b) = \frac{\left(\sum_{k=q-(Q-1)/2}^{q+(Q-1)/2} a_k(t_b)\right)^2}{Q\left(\sum_{k=q-(Q-1)/2}^{q+(Q-1)/2} a_k(t_b)\right)^2}$$

In block 1207, when semblance value $S_v(t_b)$ is greater than or equal to the semblance-value threshold T, control flows to block 1208; otherwise, control flows to decision block 1209. The coherency value is a measure of coherence in the amplitudes $a_k(t_b)$ of the pseudo-deblended residual $res_{i-1}^{(s)}$ at time sample $t_b$. In block 1208, a coherency filter may be applied to the set of amplitudes $\{a_k(t_b)\}$, where k ranges from $$q - \frac{(Q-1)}{2} \text{ to } q + \frac{(Q-1)}{2}.$$

The coherency filter may be any one of a median filter, frequency-space deconvolution, tau-p filter, or a frequency-wavenumber filter used to separate coherent energy from incoherent energy. In decision block 1209, when all of the time samples of pseudo-deblended residual $res_{i-1}^{(s)}$ have been considered, control flows to block 1210; otherwise the operations represented blocks 1206-1208 are repeated for another time sample level.

In block 1210, the coherent energy obtained in block 1208 for all time samples of the pseudo-deblended residual $res_{i-1}^{(s)}$ may be collected to form a corresponding coherent-energy gather, $c^{(s)}$. In block 1211, the coherent energy of coherent-energy gather $c^{(s)}$ may be used to update a corresponding previous deblended gather to give an updated deblended gather:

$$\hat{m}_{s,i} = \hat{m}_{s,i-1} + c^{(s)} \tag{14}$$

In decision block 1212, when the operations in blocks 1205-1212 have been repeated for all S, control flows to block 1214. Otherwise, control flows to block 1213 in which s is incremented and the operations in blocks 1205-1212 are repeated.

In block 1214, the residual may be updated by first blending the deblended seismic data to obtain blended coherent energy:

$$\text{blend}(c^{(1)}, c^{(2)}, \ldots, c^{(S)}) = \sum_{s=1}^{S} \text{time\_shift}_{\tau_{sl}}(c^{(s)}) \tag{15}$$

where $\text{time\_shift}(c^{(s)})$ is calculated by adding $\tau_{sl}$ to the time component of each trace in the coherent-energy gather $c^{(s)}$.

The blended coherent energy blend $(c^{(1)}, c^{(2)}, \ldots, c^{(s)})$ may be subtracted from the residual to give an updated residual:

$$res_i = res_{i-1} - \text{blend}(c^{(1)}, c^{(2)}, \ldots, c^{(s)}) \tag{16}$$

After the residual $res_i$ has been updated, the method returns to execute the operation represented by decision block 1105 in the flow-control diagram in FIG. 11.

Figure 13:
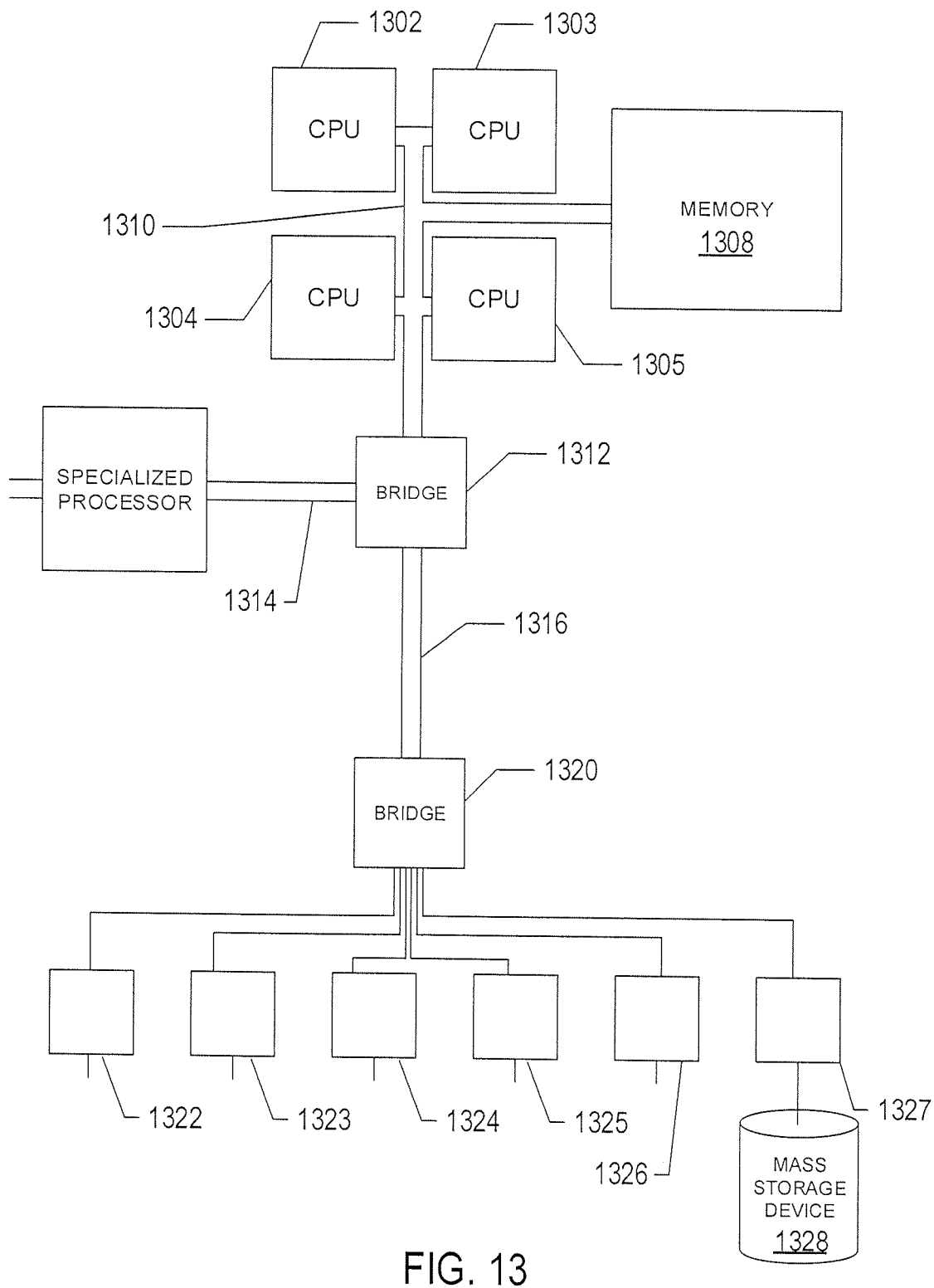
FIG. 13 shows an example of a generalized computer system.

FIG. 13 shows an example of a generalized computer system that executes efficient methods for seismic source separation and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1302-1305, one or more electronic memories 1308 interconnected with the CPUs by a CPU/memory-subsystem bus 1310 or multiple busses, a first bridge 1312 that interconnects the CPU/memory-subsystem bus 1310 with additional busses 1314 and 1316, or other types of high-speed interconnection media, including multiple, high-speed serial interconnects. The busses or serial interconnections, in turn, connect the CPUs and memory with specialized processors, such as a graphics processor 1318, and with one or more additional bridges 1320, which are interconnected with high-speed serial links or with multiple controllers 1322-1327, such as controller 1327, that provide access to various different types of computer-readable media, such as computer-readable medium 1328, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1328 is a data-storage device, including electronic memory, optical or magnetic disk drive, USB drive, flash memory and other such data-storage device. The computer-readable medium 1328 can be used to store machine-readable instructions that encode the computational methods described above and can be used to store encoded data, during store operations, and from which encoded data can be retrieved, during read operations, by computer systems, data-storage systems, and peripheral devices.

FIGS. 14A-14C show results of seismic source separation applied to blended seismic data generated by two sources sorted into common-shot gathers. FIG. 14A shows a common-shot gather of blended seismic data obtained from SSA using a primary source and a secondary source. The energy generated by the secondary source is identified by dashed oval 1401. FIG. 14B shows the common-shot gather after applying typical seismic source separation, which does not include a semblance value constraint, to give deblended seismic data associated with the primary source. However, dashed oval 1402 encircles a significant amount of interfering energy originating from the secondary source that has leaked past the filter to contaminate the energy associated with the primary source. FIG. 14C shows the common-receiver gather after applying the seismic source separation method with semblance analysis described above to give deblended seismic data associated with the primary source. Dashed oval 1403 encircles a small portion of interfering energy that originates from the secondary source and has leaked passed the filter. The results displayed in FIG. 14C reveal that the method described above allows significantly less energy originating from the secondary source to contaminate the energy associated with the primary source.

The methods described above may be implemented in real time on board a survey vessel while a survey is being conducted. For example, deblended gathers may be generated after each recording period. The deblended gathers described above may produce a geophysical data product indicative of certain properties of a subterranean formation. The geophysical data product may include processed seismic geophysical data and may be stored on a computer-readable medium as described above. The geophysical data product may be produced offshore (i.e. by equipment on survey vessel) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

Although the above disclosure has been described in terms of particular embodiments, it is not intended that the disclosure be limited to these embodiments. Modifications within the spirit of the disclosure will be apparent to those skilled in the art. For example, any of a variety of different implementations of the method described above for seismic source separation may be carried out by varying any of many different design and development parameters, including programming language, underlying operating system, modular organization, control structures, data structures, and other such design and development parameters. The methods may also be carried out in the frequency domain by first transforming the blended seismic data $\hat{P}'$ in the time domain to blended seismic data $\hat{P}'$ in the frequency domain, using multiplication by the time-delay phase $\Gamma_{s,i}=\exp(-j\omega\tau_{s,i})$ to affect time shifts, and transforming the resulting frequency-domain deblended gathers $\{m_{s,i}\}_{s=1}^{S}$ back to time-domain deblended gathers $\{\hat{m}_{s,i}\}_{s=1}^{S}$. Examples of suitable transforms include, but are not limited to, a fast Fourier transform and a Laplace transform.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process for determining properties of a subterranean formation from blended seismic data recorded by receivers in a marine survey of the subterranean formation, the recorded blended seismic data representing acoustic energy reflected from the subterranean formation in response to acoustic energy generated by activating two or more seismic sources with dithered time delays, the process comprising:
   calculating a residual based on the recorded blended seismic data and the dithered time delays;
   pseudo-deblending the residual for each activated source to obtain pseudo-deblended residuals, such that each pseudo-deblended residual is aligned in time with one of the dithered time delays;
   iteratively performing for each pseudo-deblended residual
      calculating a semblance value for amplitudes of the pseudo-deblended residual at each time-sample level,
      coherency filtering the amplitudes of the pseudo-deblended residual with a semblance value greater than a semblance-value threshold at each time-sample level to separate coherent energy from incoherent energy of the pseudo-deblended residual,
      forming a coherent-energy gather from the coherent energy, and updating a deblended gather associated with the pseudo-deblended residual by adding the coherent-energy gather to the deblended gather; and
   determining properties of the subterranean formation based on one or more deblended gathers, wherein each deblended gather corresponds to activating one of the two or more sources without interfering acoustic energy.

2. The process of claim 1 wherein calculating the residual comprises calculating a difference between the recorded blended seismic data and the deblended gathers multiplied by a blending matrix based on the dithered time delays in the frequency domain.

3. The process of claim 1 wherein pseudo-deblending the residual for each activated source to obtain the pseudo-deblended residuals comprises:
   for each time delay of the dithered time delays, subtracting the time delay from traces of the residual to obtain one of the pseudo-deblended residuals.

4. The process of claim 1 wherein calculating the residual comprises calculating a difference between the recorded blended seismic data and deblended gathers convolved with a blending matrix based on the dithered time delays in the time domain.

5. The process of claim 1 further comprising decreasing the semblance-value threshold for each update of the deblended gather.

6. The process of claim 1 further comprising:
   blending coherent-energy gathers associated with the pseudo-deblended residuals to generate a blended coherent-energy gather; and
   subtracting the blended coherent-energy gather from the residual to obtain an updated residual.

7. The process of claim 1 further comprising sorting the blended seismic data into at least one of a common-shot domain, common-receiver domain, common receiver-station domain, and a common-midpoint domain.

8. A computer system for determining properties of a subterranean formation from deblending seismic data recorded in marine survey of the subterranean formation, the system comprising:
   one or more processors;
   one or more data-storage devices; and
   a routine stored in the one or more of the data-storage devices that when executed by the one or more processors controls the system to perform operations comprising:
      receiving recorded blended seismic data representing acoustic energy reflected from the subterranean formation in response to acoustic energy generated by activating two or more seismic sources with dithered time delays in a body of water above the subterranean formation;
      calculating a residual based on the recorded blended seismic data and the dithered time delays;
      pseudo-deblending the residual for each activated source to obtain pseudo-deblended residuals, such that each pseudo-deblended residual is aligned in time with one of the dithered time delays;
      iteratively performing for each pseudo-deblended residual
         calculating a semblance value for amplitudes of the pseudo-deblended residual at each time-sample level,
         coherency filtering the amplitudes of the pseudo-deblended residual with a semblance value greater than a semblance-value threshold at each time-sample level to separate coherent energy from incoherent energy of the pseudo-deblended residual,
         forming a coherent-energy gather from the coherent energy, and
         updating a deblended gather associated with the pseudo-deblended residual by adding the coherent-energy gather to the deblended gather; and determining properties of the subterranean formation based on deblended gathers.

9. The computer system of claim 8 wherein calculating the residual comprises calculating a difference between the recorded blended seismic data and the deblended gathers multiplied by a blending matrix based on the dithered time delays in the frequency domain.

10. The computer system of claim 8 wherein pseudo-deblending the residual for each activated source to obtain the pseudo-deblended residuals comprises:
for each time delay of the dithered time delays, subtracting the time delay from traces of the residual to obtain one of pseudo-deblended residuals.

11. The computer system of claim 8 wherein calculating the residual comprises calculating a difference between the recorded blended seismic data and deblended gathers convolved with a blending matrix based on the dithered time delays in the time domain.

12. The computer system of claim 8 further comprising decreasing the semblance-value threshold for each update of the deblended gather.

13. The computer system of claim 8 further comprising:
blending coherent-energy gathers associated with the pseudo-deblended residuals to generate a blended coherent-energy gather; and
subtracting the blended coherent-energy gather from the residual to obtain an updated residual.

14. A non-transitory computer-readable medium having machine-readable instructions encoded thereon for enabling one or more processors of a computer system to perform operations comprising:
receiving recorded blended seismic data representing acoustic energy reflected from a subterranean formation in response to acoustic energy generated by activating two or more seismic sources with dithered time delays in a body of water above the subterranean formation;
calculating a residual based on the recorded blended seismic data and the dithered time delays;
pseudo-deblending the residual for each activated source to obtain pseudo-deblended residuals, such that each pseudo-deblended residual is aligned in time with one of the dithered time delays;
iteratively performing for each pseudo-deblended residual
calculating a semblance value for the amplitudes of the pseudo-deblended residual at each time-sample level,
coherency filtering amplitudes of the pseudo-deblended residual with a semblance value greater than a semblance-value threshold at each time-sample level to separate coherent energy from incoherent energy of the pseudo-deblended residual,
forming a coherent-energy gather from the coherent energy, and
updating a deblended gather associated with the pseudo-deblended residual by adding the coherent-energy gather to the deblended gather; and
determining properties of the subterranean formation based on deblended gathers.

15. The computer-readable medium of claim 14 wherein calculating the residual comprises calculating a difference between the blended seismic data and the deblended gathers multiplied a blending matrix based on the dithered time delays in the frequency domain.

16. The computer-readable medium of claim 14 wherein pseudo-deblending the residual for each activated source to obtain the pseudo-deblended residuals comprises:
for each time delay of the dithered time delays, subtracting the time delay from traces of the residual to obtain one of pseudo-deblended residuals.

17. The computer-readable medium of claim 14 wherein calculating the residual comprises calculating a difference between the recorded blended seismic data and deblended gathers convolved with a blending matrix of the dithered time delays in the time domain.

18. The computer-readable medium of claim 14 further comprising decreasing the semblance-value threshold for each update of the deblended gather.

19. The computer-readable medium of claim 14 further comprising:
blending coherent-energy gathers associated with the pseudo-deblended residuals to generate a blended coherent-energy gather; and
subtracting the blended coherent-energy gather from the residual to obtain an updated residual.

* * * * *